(12) United States Patent  
Miu et al.

(10) Patent No.: US 9,374,025 B2  
(45) Date of Patent: Jun. 21, 2016

(54) CONTROL CIRCUIT AND ELECTRICAL DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Honglin Miu, Beijing (CN); Huixuan Guo, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/488,057

(22) Filed: Sep. 16, 2014

(65) Prior Publication Data

US 2015/0311830 A1    Oct. 29, 2015

(30) Foreign Application Priority Data

Apr. 23, 2014  (CN) .......................... 2014 1 0166048

(51) Int. Cl.
*H02P 3/22* (2006.01)

(52) U.S. Cl.
CPC ........................................ *H02P 3/22* (2013.01)

(58) Field of Classification Search
CPC ........................................................ H02P 3/22
USPC ......................................... 318/379, 375, 362
See application file for complete search history.

(56) References Cited

U.S. PATENT DOCUMENTS

| 4,394,605 A | * | 7/1983 | Terazawa | ............. | H02H 7/0851 |
| | | | | | 315/280 |
| 5,334,922 A | * | 8/1994 | Manini | ..................... | H02P 1/44 |
| | | | | | 318/772 |
| 6,559,614 B2 | * | 5/2003 | Kock | ..................... | B60J 7/0573 |
| | | | | | 307/10.1 |

FOREIGN PATENT DOCUMENTS

| CN | 1838002 A | 9/2006 |
| CN | 103199771 A | 7/2013 |
| CN | 203416199 U | 1/2014 |

OTHER PUBLICATIONS

First Office Action regarding Chinese application No. 201410166048.X, dated Jan. 26, 2016. Translation provided by Dragon Intellectual Property Law Firm.

* cited by examiner

*Primary Examiner* — David S Luo

(74) *Attorney, Agent, or Firm* — Harness, Dickey & Pierce, P.L.C.

(57) ABSTRACT

The control circuit includes: a first power supply, including a high-level output and a low-level output; a first circuit, including two inputs, a driver module and at least two braking switch units, the two inputs being respectively connected to the high-level output and the low-level output of the first power supply, and the driver module being in series connected to the at least two braking switch units, where the driver module includes two outputs that are the outputs of the control circuit; and braking circuits, which correspond to the braking switch units in a one to one manner, and are used to the control switching states of the braking switch units.

20 Claims, 1 Drawing Sheet

US 9,374,025 B2

CONTROL CIRCUIT AND ELECTRICAL DEVICE

CROSS-REFERENCE TO RELATED APPLICATION

This application claims priority to Chinese Patent Application No. 201410166048.X filed on Apr. 23, 2014, the disclosure of which is incorporated in its entirety by reference herein.

TECHNICAL FIELD

The present disclosure relates to the field of automatic control, and in particular to a control circuit and an electrical device.

BACKGROUND

An industrial robot is a machine that automatically performs tasks, and is a robot that implements various functions by means of the power and controlling capability of itself. The industrial robot has a good compatibility due to that it may operate in accordance with preset programs. In addition, the industrial robot may replace the human to take some monotonous, frequent and repetitive works in the industrial production, or may replace the human to work in a dangerous and harsh environment.

A control circuit is provided according to the present disclosure, in order to stop operating a motor in case of emergency.

SUMMARY

An embodiment of the present disclosure provides a control circuit that is capable of ensuring the reliability of a driver circuit and guaranteeing a device can operate stably.

In order to achieve the above object, the embodiments of the present disclosure adopt the following solutions.

A control circuit, including:

a first power supply, including a high-level output and a low-level output;

a first circuit, including two inputs, a driver module and at least two braking switch units, the two inputs being respectively connected to the high-level output and the low-level output of the first power supply, and the driver module being in series connected to the at least two braking switch units, wherein the driver module includes two outputs that are the outputs of the control circuit;

braking circuits, corresponding to the braking switch units in a one to one manner and configured to control switching states of the braking switch units.

Optionally, the control circuit may further include:

at least one second power supply including a high-level output and a low-level output;

wherein each of the braking circuits includes two inputs that are respectively connected to the high-level output and the low-level output of the second power supply.

Optionally, the control circuit may include one second power supply, and the two inputs of each of the braking circuits are respectively connected to the high-level output and the low-level output of the second power supply.

Optionally, the braking switch unit may be a relay that includes two switch inputs and two switch outputs, the two switch outputs are in series connected to the first circuit.

Optionally, a contact of the relay may be a normally-closed contact.

Optionally, the braking circuit may include a diode, the anode of the diode may be connected to the high-level output of the second power supply and one of the two switch inputs of the relay, and the cathode of the diode may be connected to the low-level output of the second power supply and the other one of the two switch inputs of the relay.

Optionally, the first circuit may include two braking switch units, and the control circuit may include two braking circuits that correspond to the two braking switch units in a one to one manner.

Optionally, the braking circuits are the same or not the same.

Optionally, the first circuit further may include at least one fuse that is in series connected to the switch units and the driver module.

Optionally, the first circuit may include two fuses, one end of the two fuses are respectively connected to the high-level output and the low-level output of the first power supply.

Optionally, the driver module may include a first resistor, a second resistor and two diodes, and wherein, the input of the first resistor is connected to the high-level output of the first power supply through the braking switch unit, and the output of the first resistor is connected to the input of the second resistor;

the output of the second resistor is connected to the low-level output of the first power supply;

the anode of one of the two diodes is connected to the input of the first resistor, and the cathode of the diode is connected to the output of the first resistor;

the anode of the other one of the two diodes is connected to output of the first resistor, and the cathode of the other diode is connected to the output of the second resistor; and the output of the first resistor is a first output of the driver module, and the output of the second resistor is a second output of the driver module.

An electrical device, including the above mentioned control circuit.

An embodiment of the present disclosure provides a control circuit, which includes at least two braking switch units and a driver module in series connected to braking switch units. The switching state of each of the braking switch units may be controlled by a corresponding braking circuit, and thus the output state of the driver module may be controlled by the two braking circuits. Therefore, the reliability of the driver module in the control circuit may be further improved, guaranteeing that the device operate in safety.

BRIEF DESCRIPTION OF THE DRAWINGS

In order to explain the embodiments of the present disclosure or solutions of the prior art more clearly, the appended drawings to be used in the description of the embodiments or the prior art will be simply introduced in the following. Apparently, the appended drawings in the following descriptions are merely a part of the embodiments of the present disclosure. For the ordinary skilled in the art, other drawings may be obtained from these drawings without creative works.

REFERENCE SYMBOLS

1—high-level output; 2—low-level output; 10—first power supply; 11—first circuit; 111—driver module; 20—second power supply; 21—first braking circuit; 22—second braking circuit; 31—first braking switch unit; 32—second braking switch unit.

DETAILED DESCRIPTION

The solutions in the embodiments of the present disclosure will be clearly and completely described in conjunction with the appended drawings in the embodiments. Apparently, the described embodiments are merely a part of but not all of the embodiments of the present disclosure. All the other embodiments obtained without creative works, by the ordinary skilled in the art, from the embodiments in the specifications will fall within the protection scope of the present disclosure.

Figure 1:
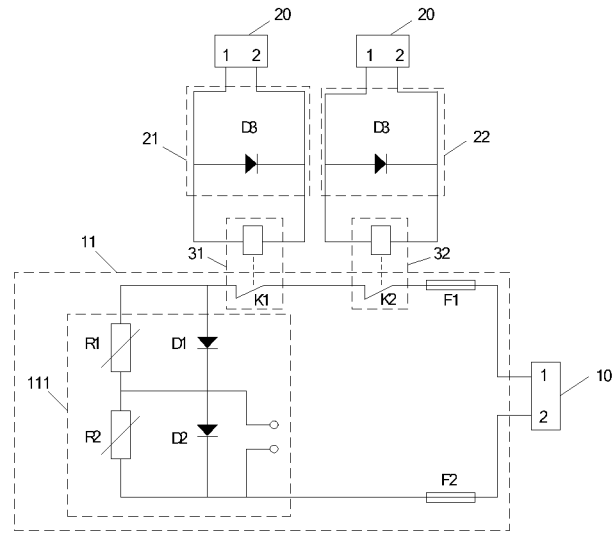
FIG. 1 is a control circuit according to an embodiment of the present disclosure.

As shown in FIG. 1, a control circuit is provided according to an embodiment of the present disclosure, the control circuit comprises:

a first power supply 10, which includes a high-level output 1 and a low-level output 2;

a first circuit 11, which includes two inputs (i.e., the two ends respectively connected to the high-level output 1 and the low-level output 2 in FIG. 1), a driver module 111 and at least two braking switch units (a first braking switch unit 31 and a second braking switch unit 32 in FIG. 1); the two inputs being respectively connected to the high-level output 1 and the low-level output 2 of the first power supply 10, and the driver module 111 being in series connected to the at least two braking switch units; where the driver module 111 includes two outputs that are the outputs of the control circuit;

braking circuits, which correspond to the braking switch units in a one to one manner; the braking circuits are used to control the switching states of the braking switch units, i.e., the first braking circuit 21 is used to control the switching state of the first braking switch unit 31, and the second braking circuit 22 is used to control the switching state of the second braking switch unit 32.

It should be noted that the embodiments and the appended drawings are explained in detail by the following as an example: the first circuit includes two braking switch units, and the control circuit includes two braking circuits that correspond to the two braking switch units in a one to one manner. That is, in FIG. 1, the first circuit 11 includes two braking switch units and two braking circuits, i.e., the first braking switch unit 31 and the second braking switch unit 32, as well as the first braking circuit 21 and the second braking circuit 22. The first braking circuit 21 controls the switching state of the first braking switch unit 31, and the second braking circuit 22 controls the switching state of the second braking switch unit 32. Of course, the control circuit may include multiple braking switch units or other switch units. The braking circuits correspond to the braking switch units of the first circuit in a one to one manner, and thus the number of the braking switch units is equal to the number of the braking circuits in the control circuit, and the each of the braking circuit controls the switching state of the corresponding braking switch units. The first power supply includes a high-level output and a low-level output. It should be noted that the high-level output or the low-level output of the first power supply may be used as an input of another circuit. The embodiments of the present disclosure are only described in conjunction with the appended drawings.

An embodiment of the present disclosure provides a control circuit, including at least two braking switch units and a driver module in series connected to the braking switch units. The switching state of each of the braking switch units is controlled through a corresponding braking circuit, and thus the output state of the driver module is controlled through two braking circuits. Therefore, the reliability of the driver module of the control circuit may be further improved, guaranteeing that the device operates in safety.

Optionally, the control circuit may further include: at least one second power supply, including a high-level output and a low-level output; wherein the braking circuit comprises two inputs respectively connected to the high-level output and the low-level output of the second power supply.

Particularly, as shown in FIG. 1, the control circuit includes two second power supplies 20. Each of the two second power supplies 2 includes a high-level output 1 and a low-level output 2, which are connected to two inputs of the first braking circuit 21 or the second braking circuits 22, so as to provide voltage signals.

Figure 2:
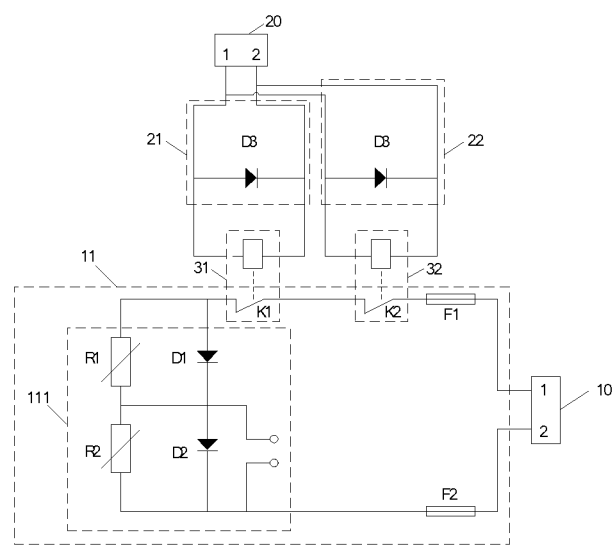
FIG. 2 is another control circuit according to an embodiment of the present disclosure.

Optionally, as shown in FIG. 2, the control circuit includes one second power supply 20. The two inputs of each of the braking circuits (i.e., the first braking circuit 21 and the second braking circuit 22) are respectively connected to the high-level output and the low-level output of the second power supply 20. As shown in FIG. 2, the first braking circuit 21 is in parallel connected to the second braking circuit 22 to reduce the number of the second power supplies.

Optionally, as shown in FIG. 1 and FIG. 2, the braking switch units are relays (i.e., the first braking switch unit 31 is a relay K1, and the second braking switch unit 32 is a relay K2), each of the relays includes two switch inputs and two switch outputs, and the two switch outputs are in series connected to the driver module.

It will be noted that a relay is typically formed of an iron core, a coil, an armature, a contact spring etc. The operating principle of an electromagnetic relay is: there will be a current flowing through the coil upon a voltage is applied across the coil, and thus the electromagnetic effect will be produced; therefore, the armature will be pulled to the iron core by the electromagnetic force overcoming the tension force of the spring, causing the moving contact of the armature to be attracted to the stationary contact (the normally-open contact) of the armature. When the power to the coil is cut off, the electromagnetic attraction force will disappear. Thus, the armature will be back to the original position under the reaction force of the spring, releasing the moving contact from the original stationary contact (normally-closed contact). Though such attraction and releasing, the turning on or turning off in the circuit may be achieved. The normally-open contact and the normally-closed contact of the relay may be differentiated as follows: when the coil of the relay is not powered on, the stationary contact in the "off" state is referred to the normally-open contract, and the stationary contact in the "on" state is referred to the normally-closed contact. The embodiments of the present disclosure are described in detail by taking that the stationary contact of the relay is normally-closed contact as an example. As shown in FIG. 1 and FIG. 2, the first braking switch unit 31 and the second braking switch unit 32 are in the closed state when the driver module normally outputs. In case of emergency, the first braking circuit 21 and/or the second braking circuit 22 would drive the first braking switch unit 31 and/or the second switch unit 32, the two inputs of the relay are cut off and the driver module stops operating.

Optionally, as shown in FIG. 1 and FIG. 2, the braking circuit (e.g., the first braking circuit 21) includes a diode D3. The anode of the diode D3 is connected to the high-level output 1 of the second power supply 20 and one of the switch inputs of the relay K1, and the cathode of the diode D3 is connected to the low-level output 2 of the second power supply and the other one of the switch inputs of the relay K1.

It should be noted that the there are multiple braking circuits that may be the same or different. By way of example, as shown in FIG. 1 and FIG. 2, the first barking circuit 21 is the same as the second braking circuit 22.

Optionally, the first circuit may further include at least one fuse that is in series connected to the switch unit and the driver module. In case of emergency or abnormality, the fuse will be automatically fused to be broke so as to cut off the current, guaranteeing the safety operation of the circuit.

Optionally, as shown in FIG. 1 and FIG. 2, the first circuit 11 includes two fuses (i.e., a first fuse F1 and a second fuse F2). The two fuses are, from one end, respectively connected to the high-level output and the low-level output of the first power supply (i.e., the first fuse F1 is connected to the high-level output 1 of the first power supply, and the second fuse F2 is connected to the low-level output 2 of the first power supply, as shown in FIG. 1 and FIG. 2).

Particularly, as shown in FIG. 1 and FIG. 2, the first circuit includes two fuses, i.e., the first fuse F1 and the second fuse F2. The fuses may be in series connected in various ways, and by way of example, as shown in FIG. 1 and FIG. 2, the first fuse F1 is, from one end, connected to the high-level output 1 of the first power supply 10, and the second fuse F2 is, from one end, connected to the low-level output 2 of the first power supply 10. The first braking switch unit 31, the second braking switch unit 32 and the driver module 111 are in series connected between the first fuse F1 and the second fuse F2.

Optionally, the driver module may include a first resistor, a second resistor, and two diodes. The input of the first resistor is connected to the high-level output of the first power supply through the braking switch unit, and the output of the first resistor is connected to the input of the second resistor. The output of the second resistor is connected to the low-level output of the first power supply. The anode of one of the diodes is connected to the input of the first resistor, and the cathode of the diode is connected to the output of the first resistor. The anode of the other one of the diode is connected to the output of the first resistor, and the cathode of the other diode is connected to the output of the second resistor. The output of the first resistor is a first output of the driver module, and the output of the second resistor is a second output of the driver module.

Particularly, as shown in FIG. 1 and FIG. 2, the driver module 111 includes a first resistor R1, a second resistor R2 and two diodes (i.e., a diode D1 and a diode D2). The input of the first resistor R1 is connected to the high-level output 1 of the first power supply 10 through the first braking switch unit K1, the second braking switch unit K2 and the first fuse F1. The output of the first resistor R1 is connected to the input of the second resistor R2.

The output of the second resistor R2 is connected to the low-level output 2 of the first power supply 10, and particularly, the output of the second resistor R2 is connected to the low-level output 2 of the first power supply 10 through the second fuse F2.

The anode of the diode D1 is connected to the input of the first resistor R1, and the cathode of the diode D1 is connected to the output of the first resistor R1.

The anode of the diode D2 is connected to output of the first resistor R1, and the cathode of the diode D2 is connected to the output of the second resistor R2.

The output of the first resistor R1 is the first output of the driver module 111, and the output of the second resistor R2 is the second output of the driver module 111.

Apparently, the driver module may further be connected in other ways, and the embodiments of the present disclosure have been described in detail by taking the control circuit shown in FIG. 1 and FIG. 2 as an example.

The above are merely the preferred embodiments of the present invention. It should be noted that, a person skilled in the art may make further modifications and improvements without departing from the principle of the present invention, and these modifications and improvements shall also be considered as the scope of the present invention.

What is claimed is:

1. A control circuit comprising:
   a first power supply comprising a high-level output and a low-level output;
   a first circuit comprising two inputs, a driver module and at least two braking switch units, the two inputs being respectively connected to the high-level output and the low-level output of the first power supply, and the driver module being in series connected to the at least two braking switch units, wherein the driver module comprises two outputs that which are the outputs of the control circuit;
   braking circuits corresponding to the braking switch units in a one to one manner and configured to control switching states of the braking switch units; and
   a second power supply comprising a high-level output and a low-level output,
   wherein each of the braking circuits comprises two inputs that are respectively connected to the high-level output and the low-level output of the second power supply.

2. The control circuit according to claim 1, wherein the braking switch unit is a relay that comprises two switch inputs and two switch outputs, the two switch outputs are in series connected to the first circuit.

3. The control circuit according claim 2, wherein a contact of the relay is a normally-closed contact.

4. The control circuit according to claim 3, wherein the driver module comprises a first resistor, a second resistor and two diodes, and wherein,
   the input of the first resistor is connected to the high-level output of the first power supply through the braking switch unit, and the output of the first resistor is connected to the input of the second resistor;
   the output of the second resistor is connected to the low-level output of the first power supply;
   the anode of one of the two diodes is connected to the input of the first resistor, and the cathode of the diode is connected to the output of the first resistor;
   the anode of the other one of the two diodes is connected to output of the first resistor, and the cathode of the other diode is connected to the output of the second resistor; and
   the output of the first resistor is a first output of the driver module, and the output of the second resistor is a second output of the driver module.

5. The control circuit according to claim 2, wherein the braking circuit comprises a diode, the anode of the diode is connected to the high-level output of the second power supply and one of the two switch inputs of the relay, and the cathode of the diode is connected to the low-level output of the second power supply and the other one of the two switch inputs of the relay.

6. The control circuit according to claim 5, wherein the driver module comprises a first resistor, a second resistor and two diodes, and wherein,
   the input of the first resistor is connected to the high-level output of the first power supply through the braking switch unit, and the output of the first resistor is connected to the input of the second resistor;

the output of the second resistor is connected to the low-level output of the first power supply;

the anode of one of the two diodes is connected to the input of the first resistor, and the cathode of the diode is connected to the output of the first resistor;

the anode of the other one of the two diodes is connected to output of the first resistor, and the cathode of the other diode is connected to the output of the second resistor; and the output of the first resistor is a first output of the driver module, and the output of the second resistor is a second output of the driver module.

7. The control circuit according to claim 2, wherein the driver module comprises a first resistor, a second resistor and two diodes, and wherein, the input of the first resistor is connected to the high-level output of the first power supply through the braking switch unit, and the output of the first resistor is connected to the input of the second resistor;

the output of the second resistor is connected to the low-level output of the first power supply;

the anode of one of the two diodes is connected to the input of the first resistor, and the cathode of the diode is connected to the output of the first resistor;

the anode of the other one of the two diodes is connected to output of the first resistor, and the cathode of the other diode is connected to the output of the second resistor; and the output of the first resistor is a first output of the driver module, and the output of the second resistor is a second output of the driver module.

8. The control circuit according to claim 1, wherein the first circuit comprises two braking switch units, and the control circuit comprises two braking circuits that correspond to the two braking switch units in a one to one manner.

9. The control circuit according to claim 8, wherein the braking circuits are the same or not the same.

10. The control circuit according to claim 8, wherein the driver module comprises a first resistor, a second resistor and two diodes, and wherein, the input of the first resistor is connected to the high-level output of the first power supply through the braking switch unit, and the output of the first resistor is connected to the input of the second resistor;

the output of the second resistor is connected to the low-level output of the first power supply;

the anode of one of the two diodes is connected to the input of the first resistor, and the cathode of the diode is connected to the output of the first resistor;

the anode of the other one of the two diodes is connected to output of the first resistor, and the cathode of the other diode is connected to the output of the second resistor; and the output of the first resistor is a first output of the driver module, and the output of the second resistor is a second output of the driver module.

11. The control circuit according to claim 1, wherein the first circuit further comprises at least one fuse that is in series connected to the switch units and the driver module.

12. The control circuit to claim 11, wherein the first circuit comprises two fuses, one end of the two fuses are respectively connected to the high-level output and the low-level output of the first power supply.

13. The control circuit according to claim 12, wherein:
the driver module comprises a first resistor, a second resistor and two diodes, and wherein:

the input of the first resistor is connected to the high-level output of the first power supply through the braking switch unit;

the output of the first resistor is connected to the input of the second resistor;

the output of the second resistor is connected to the low-level output of the first power supply;

the anode of one of the two diodes is connected to the input of the first resistor, and the cathode of the diode is connected to the output of the first resistor;

the anode of the other one of the two diodes is connected to output of the first resistor, and the cathode of the other diode is connected to the output of the second resistor; and the output of the first resistor is a first output of the driver module, and the output of the second resistor is a second output of the driver module.

14. The control circuit according to claim 11, wherein the driver module comprises a first resistor, a second resistor and two diodes, and wherein, the input of the first resistor is connected to the high-level output of the first power supply through the braking switch unit, and the output of the first resistor is connected to the input of the second resistor;

the output of the second resistor is connected to the low-level output of the first power supply;

the anode of one of the two diodes is connected to the input of the first resistor, and the cathode of the diode is connected to the output of the first resistor;

the anode of the other one of the two diodes is connected to output of the first resistor, and the cathode of the other diode is connected to the output of the second resistor; and the output of the first resistor is a first output of the driver module, and the output of the second resistor is a second output of the driver module.

15. The control circuit according to claim 1, wherein the driver module comprises a first resistor, a second resistor and two diodes, and wherein, the input of the first resistor is connected to the high-level output of the first power supply through the braking switch unit, and the output of the first resistor is connected to the input of the second resistor;

the output of the second resistor is connected to the low-level output of the first power supply;

the anode of one of the two diodes is connected to the input of the first resistor, and the cathode of the diode is connected to the output of the first resistor;

the anode of the other one of the two diodes is connected to output of the first resistor, and the cathode of the other diode is connected to the output of the second resistor; and the output of the first resistor is a first output of the driver module, and the output of the second resistor is a second output of the driver module.

16. An electrical device, comprising the control circuit according to claim 1.

17. A control circuit comprising:
a first power supply comprising a high-level output and a low-level output;
a first circuit comprising two inputs, a driver module and at least two braking switch units, the two inputs being respectively connected to the high-level output and the low-level output of the first power supply, and the driver module being in series connected to the at least two braking switch units, wherein the driver module comprises two outputs that are the outputs of the control circuit;

braking circuits corresponding to the braking switch units in a one to one manner and configured to control switching states of the braking switch units; and at least one second power supply comprising a high-level output and a low-level output, wherein each of the braking circuits comprises two inputs that are respectively connected to the high-level output and the low-level output of the second power supply, and wherein the braking switch unit is a relay that comprises two switch inputs and two switch outputs, the two switch outputs are in series connected to the first circuit.

18. The control circuit according to claim 17, wherein a contact of the relay is a normally-closed contact.

19. The control circuit according to claim 17, wherein the braking circuit comprises a diode, the anode of the diode is connected to the high-level output of the second power supply and one of the two switch inputs of the relay, and the cathode of the diode is connected to the low-level output of the second power supply and the other one of the two switch inputs of the relay.

20. A control circuit comprising:

a first power supply comprising a high-level output and a low-level output;

a first circuit comprising two inputs, a driver module and at least two braking switch units, the two inputs being respectively connected to the high-level output and the low-level output of the first power supply, and the driver module being in series connected to the at least two braking switch units, wherein the driver module comprises two outputs that are the outputs of the control circuit; and braking circuits corresponding to the braking switch units in a one to one manner and configured to control switching states of the braking switch units, wherein the first circuit comprises two braking switch units, and the control circuit comprises two braking circuits that correspond to the two braking switch units in a one to one manner.

* * * * *